(12) United States Patent
Ouyang et al.

(10) Patent No.: US 6,637,577 B2
(45) Date of Patent: Oct. 28, 2003

(54) BANKNOTE SCOPE

(76) Inventors: Chieh Ouyang, Huli District, Huoju Development Zone, Xiamen, Fujian (CN); Liming Chao, Huli District, Huoju Development Zone, Xiamen, Fujian (CN)

( * ) Notice: Subject to any disclaimer, the term of this patent is extended or adjusted under 35 U.S.C. 154(b) by 0 days.

(21) Appl. No.: 09/924,687

(22) Filed: Aug. 9, 2001

(65) Prior Publication Data

US 2003/0029693 A1 Feb. 13, 2003

(51) Int. Cl.[7] .............................. G07D 5/00; G02B 17/06
(52) U.S. Cl. .................. 194/328; 359/439; 250/504 H; 250/493.1
(58) Field of Search ................................ 194/328, 302, 194/344, 351; 359/436, 439, 440, 601, 609, 611; 356/51, 71, 928, 929; 250/491.1, 515.1, 239, 504 H, 493.1; 283/85, 92

(56) References Cited

U.S. PATENT DOCUMENTS

| | | | |
|---|---|---|---|
| 2,059,197 A | * 11/1936 | Backer et al. | 359/801 |
| 2,161,594 A | * 6/1939 | Ruth | 356/71 |
| 3,618,765 A | * 11/1971 | Cooper et al. | 209/534 |
| 3,774,046 A | * 11/1973 | Hoch et al. | 250/485.1 |
| 5,444,263 A | * 8/1995 | Mastnak | 250/504 H |
| 5,596,402 A | * 1/1997 | Markantes et al. | 356/71 |
| 5,668,377 A | * 9/1997 | Erickson | 250/504 R |
| 5,874,742 A | * 2/1999 | Romano | 250/461.1 |
| 5,915,518 A | * 6/1999 | Hopwood et al. | 194/207 |
| 5,942,759 A | * 8/1999 | Romano | 250/461.1 |

FOREIGN PATENT DOCUMENTS

| | | | | |
|---|---|---|---|---|
| EP | 0424342 A2 | * 4/1991 | | G07D/7/00 |
| JP | 10-312480 A | * 11/1998 | | G07D/7/00 |
| JP | 2000-90885 A | * 3/2000 | | H01K/1/32 |

* cited by examiner

Primary Examiner—Mark J. Beauchaine
(74) Attorney, Agent, or Firm—Rosenberg, Klein & Lee (57) ABSTRACT

The present invention provides a banknote scope that is comprised of a lightproof cartridge and a circuit control-detecting device, wherein a light-emitting component of said detecting device is set upon the inside of the lightproof cartridge; said lightproof cartridge has a gap-detecting channel so that the light ray emitted from the detecting device exactly shines on the detecting channel via a detecting window; for observing, the lightproof cartridge has a sight-glass coordinating to the detecting window oppositely. This banknote scope can reduce the radiation of static electric to the human body, and to avoid the user unexpectedly inserting fingers into the detecting window, therefore the operation of it is very safe, and it has a cramped construction, small volume for facilitating carryover and operation.

9 Claims, 10 Drawing Sheets

FIG 1

PRIOR ART

BANKNOTE SCOPE

BACKGROUND OF THE INVENTION

1. Field of the Invention

The present invention relates to a banknote scope, and more particularly to a banknote-checking machine that is used for verifying the verity of paper money.

2. Description of Prior Art

Figure 1:
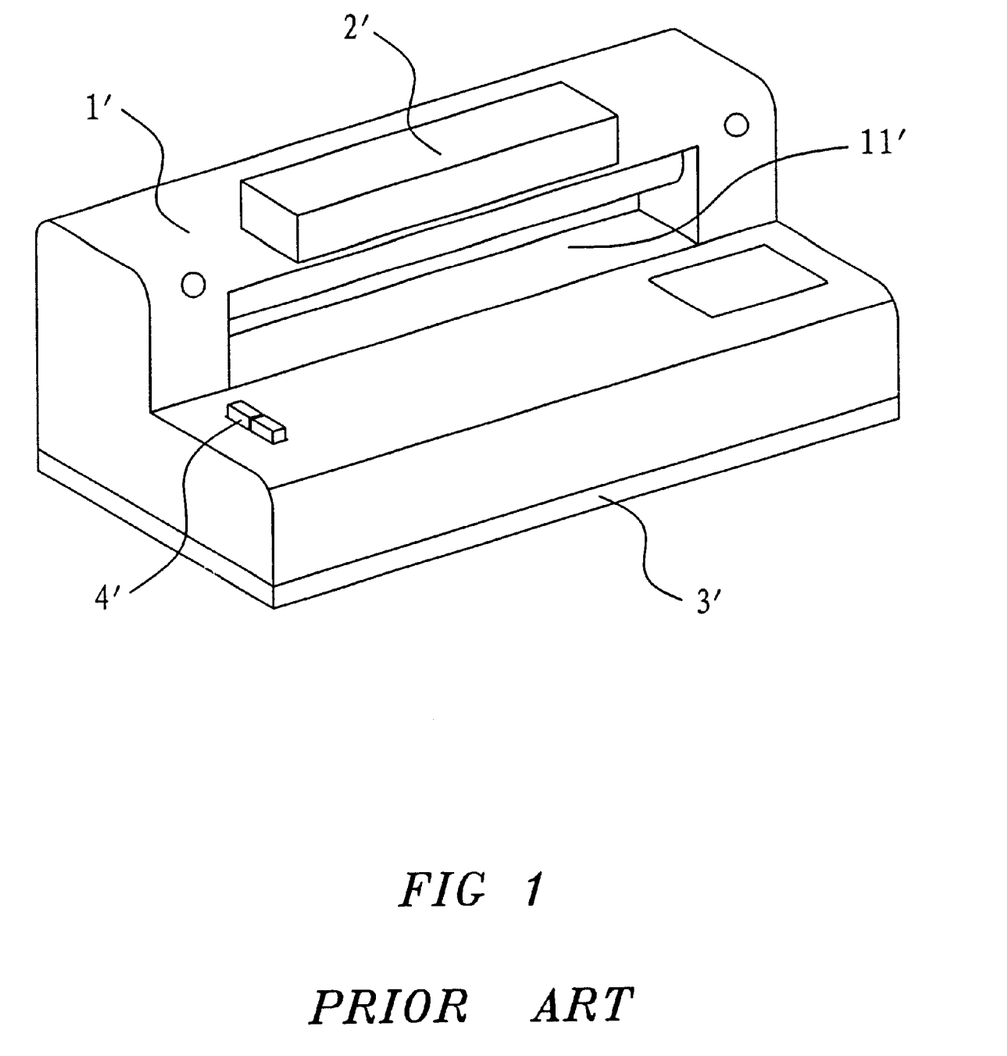
FIG. 1 is a scheme of prior art.

In accordance with the conventional banknote-checking machine, as shown in FIG. 1, it is comprised of an upper shield 1', a circuit control verifying device 2', a base stand 3'. Wherein, said verifying device 2' is set on the inner surface of the shield constructed of the upper shield 1' and the base stand 3'. In use, turn on the switcher 4' to cut in the circuit control verifying device 2', then put paper money into the verifying window 11' under the upper shield 1', by shining ultraviolet rays generated from the verifying device 2' on the upward surface of the bill, the water mark, the metal line or the value of denomination can be presented out for distinguishing the true from the counterfeit banknote.

But in operation of the above-mentioned banknote-checking machine, putting the paper money into the window under the upper shield 1', the fingers of the user may easily be affected by generated static electricity, harmful to the health of a human body. And if the operator accidentally puts his or her hand into the upper side of the verifying window 11', it is easy to be shocked by electricity, so operation safety is quite poor. In addition, the volume of the above-mentioned banknote-checking machine is excessive.

OBJECTS AND SUMMARY OF THE INVENTION

It is therefore a main object of the present invention to provide a safe banknote scope.

This object is achieved by a banknote scope that is comprised of a lightproof cartridge and a circuit control-detecting device. A light-emitting component of the detecting device is located in the inside of the light-proof cartridge, and the lightproof cartridge has a detecting window with a slot detecting channel so that the light rays emitted from the light-emitting component can shine on the detecting channel via the detecting window, and a sight-glass is formed opposite the slot detecting window.

Said lightproof cartridge is in a drum shapes, such as a cap of a pen, and the detecting device is set in the inside of a bacillary sleeve, such as a pen, and the light-emitting component is located on the tip end of the bacillary sleeve. The lightproof cartridge shades over the light head of the detecting device, and a through-hole receives the switching button of the detecting device. Said lightproof cartridge has a graded slot centralized in said through-hole at a center thereof, and said through-hole is put on the switching button of the detecting device.

Said lightproof cartridge may be comprised of an upper shield and a base-stand, the whole detecting device is mounted into the hollow cave constructed of the upper shield and the base-stand. A pair of a conducting strip and an elastic conducting strip is set upon the inside of the detecting channel.

Said sight-glass is embedded with a positive lens also.

An indicating board corresponding to the sight-glass is mounted on the inside of said detecting channel. An indicating lamp is set upon the upper shield.

Said base-stand has a groove cut into the bottom side for embedding a slide L-shape rod.

Said detecting device has two light-emitting components, one is an ultraviolet lamp, another is an infrared lamp, the both of them are connected to the control circuit of the detecting device.

By employing the above-mentioned structure, insert the paper money into the detecting channel, via the sight-glass set upon the lightproof cartridge and the positive lens embedded into the sight-glass for enlarging the picture, the user may easily check the paper money.

Due to adapting the slot detecting channel structure in the present invention, during using time, the radiating effect to the human body is reduced; meanwhile it prevents the user unexpectedly extending fingers into the detecting window to harm the health of the user. So the present invention is a safe, easy carryover instrument with cramped construction and small volume.

DETAILED DESCRIPTION OF PREFERRED EMBODIMENTS

Referring to FIG. 2 to FIG. 6, the first embodiment of the present invention includes a lightproof cartridge 1 and a circuit control-detecting device 2.

Figure 2:
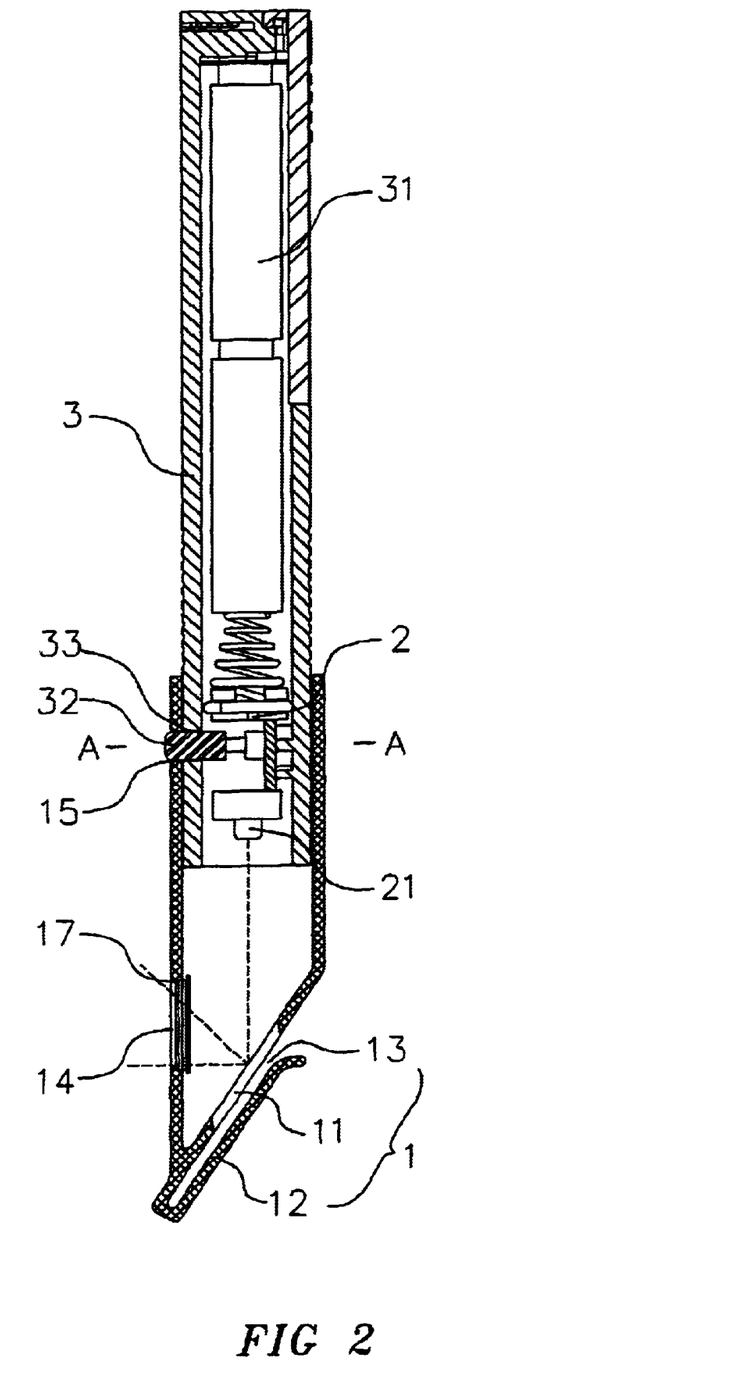
FIG. 2 is a cross-section view showing the first embodiment of the present invention.

Wherein, said detecting device 2 is applied into the conventional product (shown in the drawings), it will not be described in this context. Said detecting device 2 is mounted in a bacillary sleeve 3, and a light-emitting component 21 is located on the tip end of the bacillary sleeve 3. In the inside of the sleeve 3, the battery set 31 and switcher 32 are installed, therein the switching button 32 is located approaching the front end and extending out the sleeve 3 from the button hole 33 to be pressed down by the user so as to cut in the detecting device 2 with the cells 31.

Figure 3:
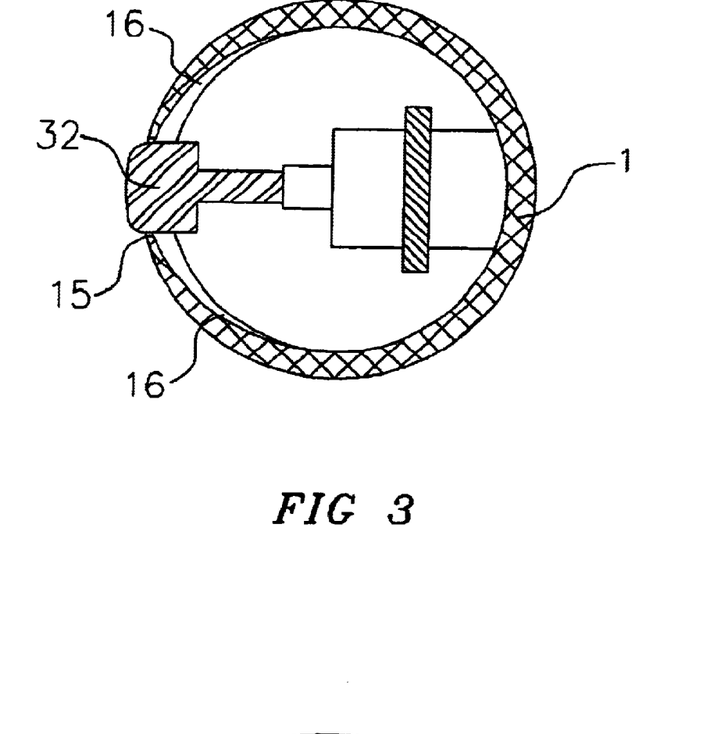
FIG. 3 is a cross-section view showing the section cut along A—A cross line of FIG. 2.

Said lightproof cartridge 1 is in a drum-shape, such as a cap of a pen, with a slanting bottom end. Said lightproof cartridge 1 opens a detecting window 11 on the bottom end and extends a L-shape strip 12 from the bottom end to form a detecting channel 13, and opens a sight-glass 14 corresponding to the detecting window 11, positioned oppositely and embedded with a positive lens 17 having an enlarged effect for facilitating the user to observe. Said lightproof cartridge 1 has a through-hole 15 formed on side wall approaching the open end, and a graded slot 16 centralizing said through-hole 15 at the inside wall, as shown in FIG. 3. The open end of the light-proof cartridge 1 connects with the end of the sleeve 3 to cover the light-emitting component 21 of the detecting device 2, meanwhile the switching button 32 extends out from the through-hole 15.

Figure 4:
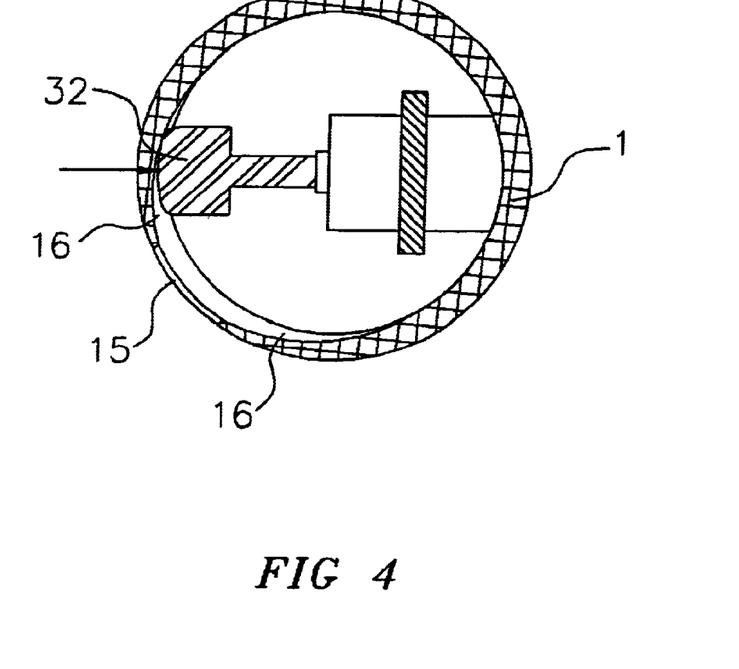
FIG. 4 is a cross-section view showing the using state of the FIG. 3.
Figure 5:
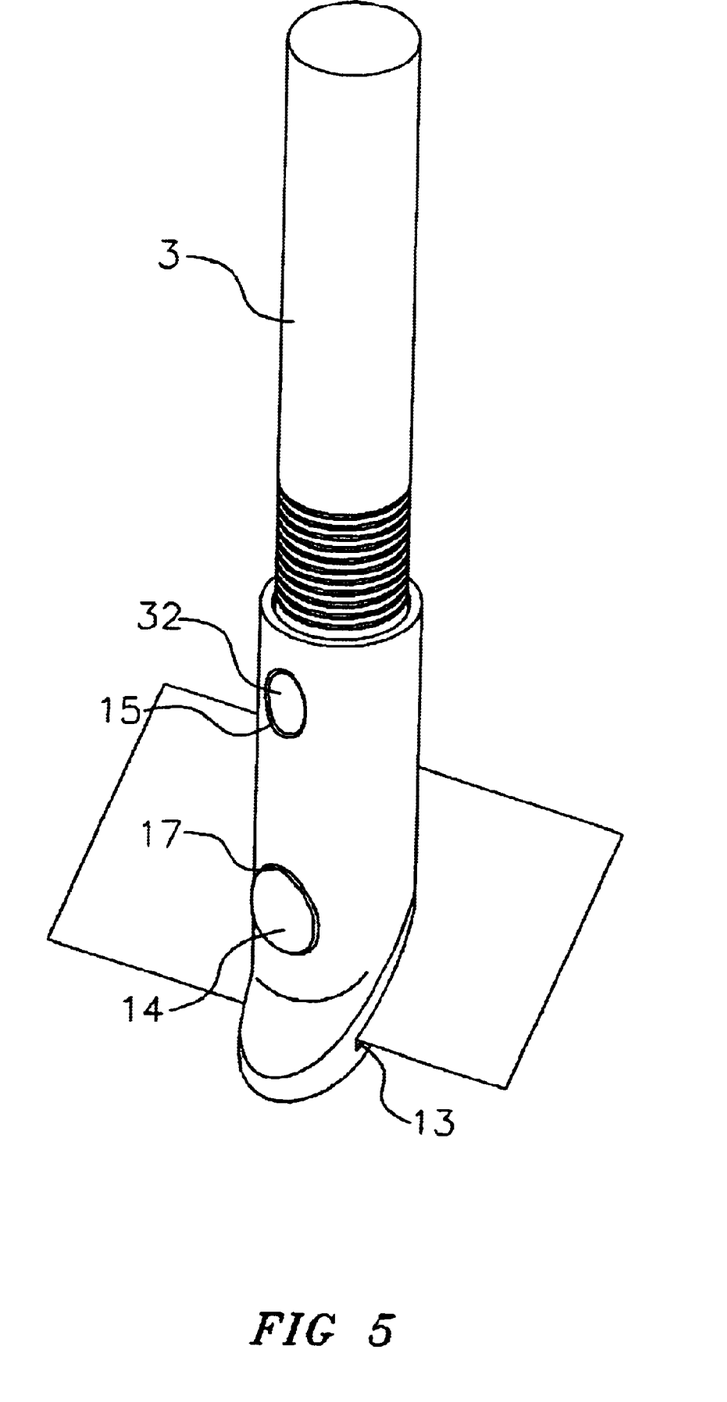
FIG. 5 is a scheme showing the first using state of the first embodiment of the present invention.

In the first embodiment, as shown in FIG. 4, a user need only turn the light-proof cartridge 1, by the inside slot 16, in order to press down the switching button 32 and keep it in the normal closed state so that the detecting device is turned on in this position, normally. Then referring to FIG. 5, when paper money is put into the gap of the detecting channel 13, the ultraviolet ray or infrared ray generated from the detecting device 2 shines on the surface of the paper money via the detecting window 11 so that the observer can make an observation through the positive lens 17 on the sight-glass 14. Therefore, because the ultraviolet ray or the infrared ray emitted by the detecting device 2 is enclosed inside of the lightproof cartridge 1, and the gap of the detecting channel 13 is very small, and the observer is observing through the sight-glass 14, the static electric radiated to the human body is decreased greatly during operation. Meanwhile this construction avoids the observer unexpectedly putting his fingers into the detecting window so that the operation of the present invention is very safe. Meanwhile the pen style banknote scope provided in the present invention has a cramped construction and small volume for facilitating carryover and operation.

Figure 6:
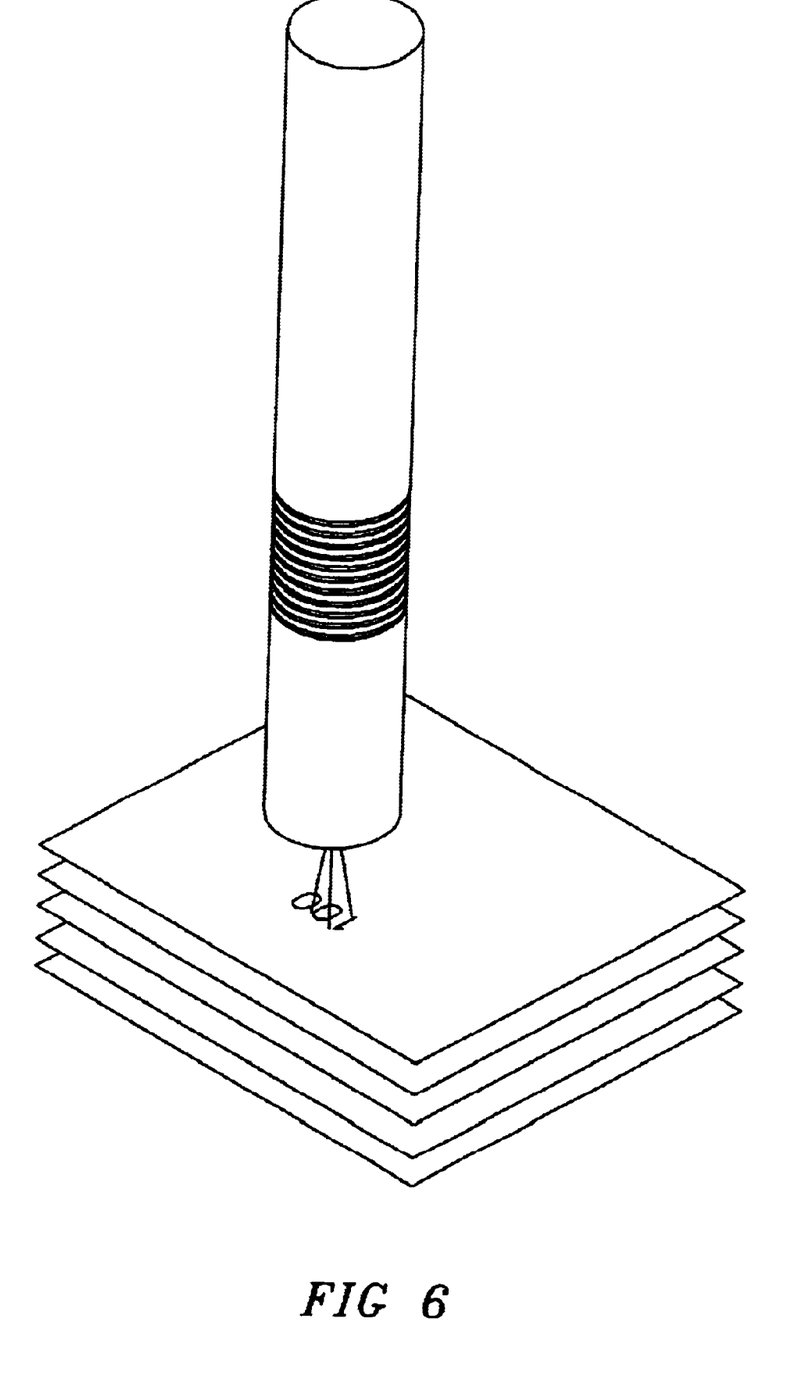
FIG. 6 is a scheme showing the second using state of the first embodiment of the present invention.

The following states of operation should be stressed:
1. Above-mentioned verifying operation is designed for detecting a single banknote; if detecting a wad of banknotes, remove the lightproof cartridge 1 from sleeve 3, as shown in FIG. 6, then direct the light-emitting component 21 of the detecting device 2 toward the banknote, and press down the switching button 32 to cut in the power to the detecting device 2 so that the ultraviolet ray or the infrared ray emitted by the detecting device 2 shoots on the surface of the banknote for verifying.
2. By use of a lock joint or screw joint, said lightproof cartridge is connected on the tip end of the sleeve 3 to avoid the ultraviolet ray or infrared ray shooting on the eyes of the observer directly, causing damage or burning of the eyeballs. In this embodiment, the lightproof cartridge 1 is attached on the tip end of the sleeve 3, and the tip end of the switching button 32 extends out from the through-hole 15. For removing the lightproof cartridge 1 from the head of the sleeve 3, first the user should press down the switching button 32, then pull off the lightproof cartridge 1 from the head of the sleeve 3 with a certain force. This construction increases the difficulty in removal of the lightproof cartridge 1 so as to prevent children or people of low-intelligence from pulling off the lightproof cartridge 1 easily, thus reducing damage caused by static radiation or burning of the eyeballs, and so on.

Figure 7:
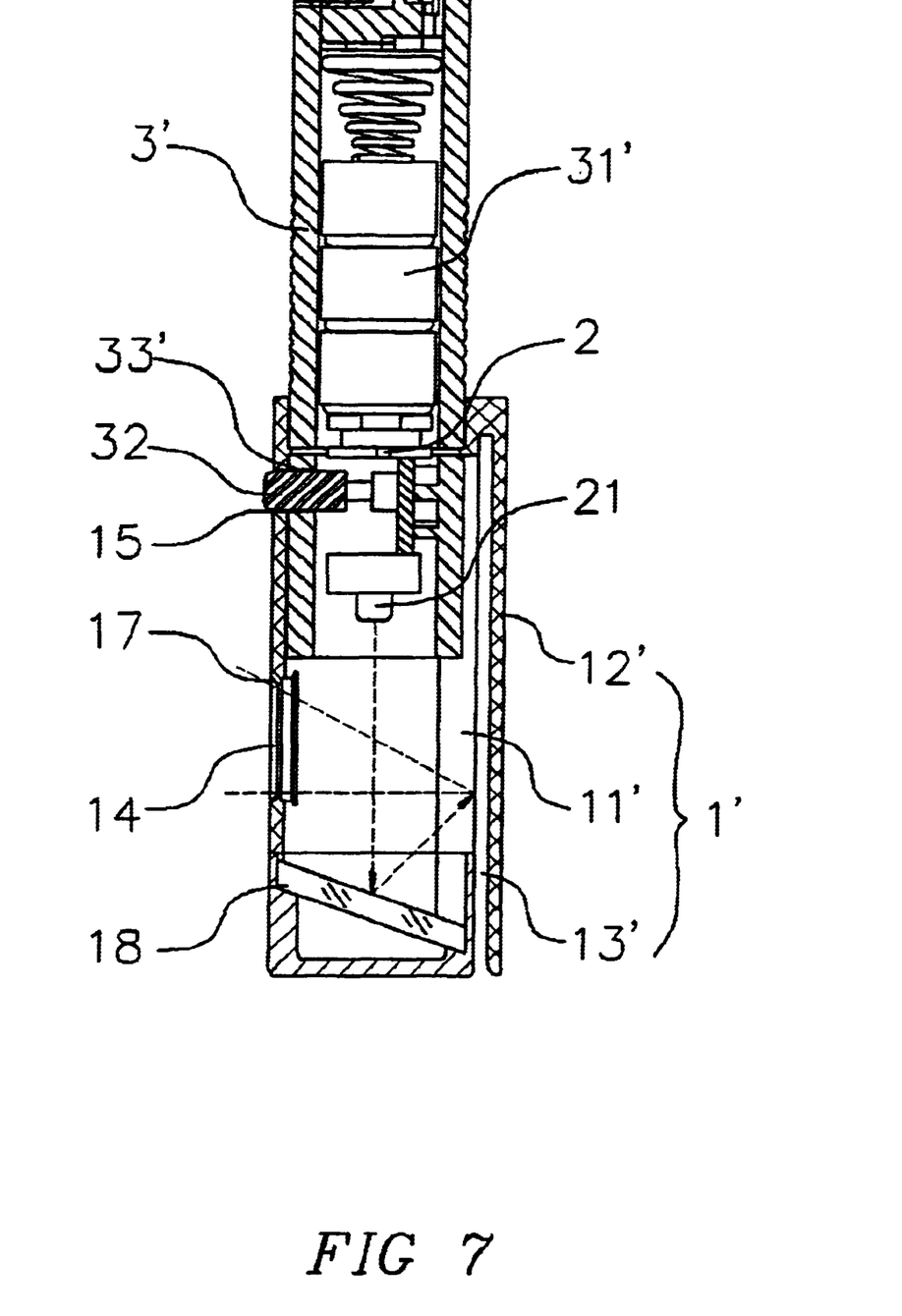
FIG. 7 is a cross-section view showing the second embodiment of the present invention.
Figure 8:
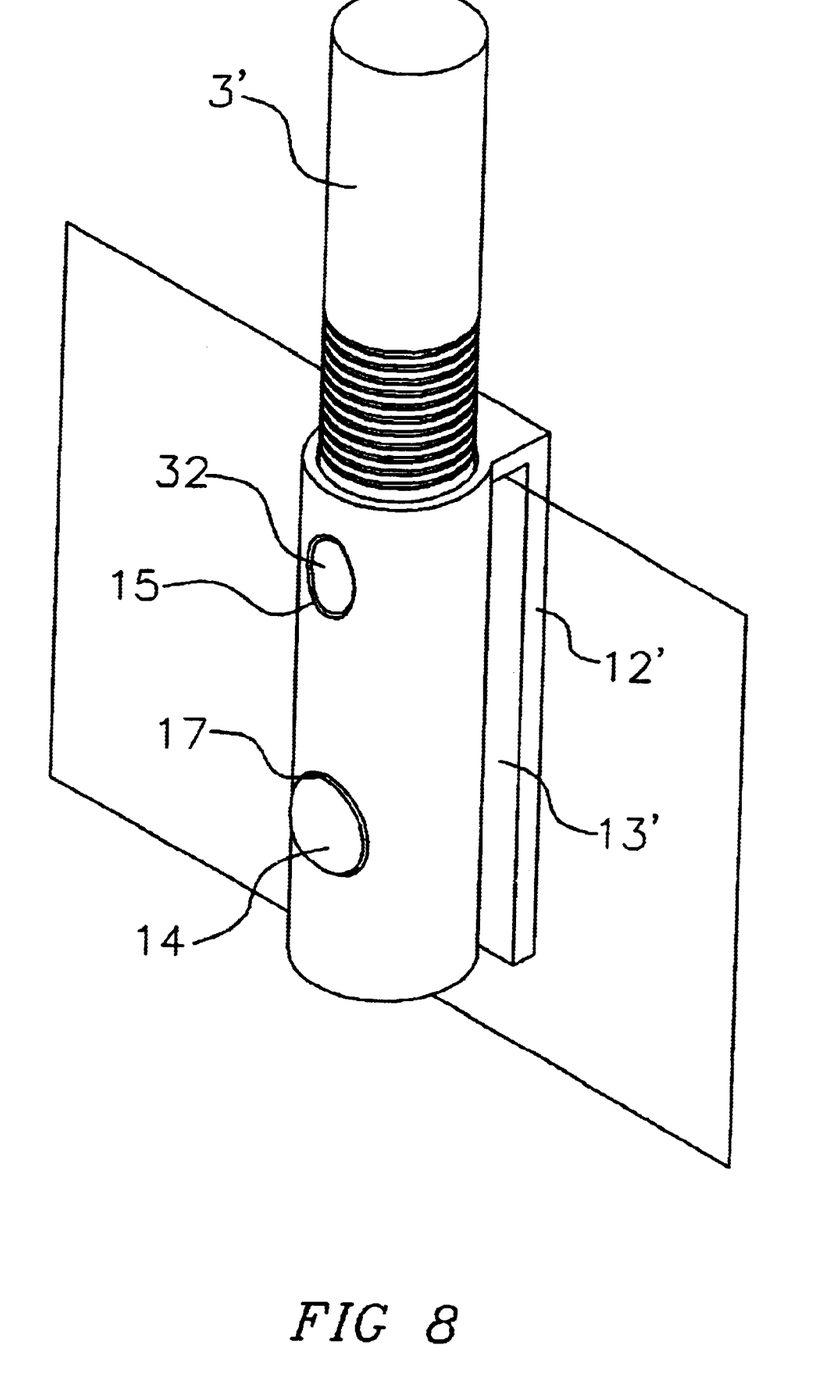
FIG. 8 is a scheme showing the using state of the second embodiment of the present invention.

Referring to FIG. 7 and FIG. 8, the second embodiment of the present invention comprises a lightproof cartridge 1 and a detecting device 2.

Wherein said detecting device 2 is mounted into a short sleeve 3'a light-emitting component 21 is located on the tip end of the short sleeve 3' and battery cells 31' and a switching button 32 are installed into the inside of the short sleeve 3'. As in the first embodiment, the tip end of the switching button 32 extends out the short sleeve through the through-hole 33' approaching the front end for facilitating the user to press down. Said switching button 32 controls the connection between the detecting device 2 and the battery cells 31'.

Said lightproof cartridge 1'is in a drum-shape, such as a cap of a pen, and a detecting window 11'is opened in the sidewall. An L-shaped strip 12'extends from the upper end to opposite the detecting window 11'at the outside, to form a gap detecting channel 13'On the opposite side of the detecting window 12'a sight-glass 14 is opened and embedded with a positive lens 17. As in the first embodiment, as shown in FIG. 3, the lightproof cartridge 1 has a through-hole 15 at the sidewall approaching the open end, and a graded slot 16 centralizing the through-hole 15 at the inside wall. Said lightproof cartridge 1 is put on the tip end of the sleeve 3' so as to cover the light-emitting component 21 of the detecting device 2 and make the tip end of the switching button 32 pass through the through-hole 15. For changing the light direction, a reflecting mirror 18 is located on the bottom side with a slope angle, so as to reflect the ultraviolet ray or the infrared ray emitted from the detecting device 2 to the detecting channel 13' via the detecting window 11'.

In operation of this embodiment, as in the first embodiment, press down the top of the switching button 32 and turn the lightproof cartridge 1 so as to make the switching button 32 keep in a normally closed state to power up the detecting device 2. Referring to FIG. 8, put a banknote into the gap of the detecting channel 13' so that the ultraviolet ray or the infrared ray reflected by the reflecting mirror projects onto the surface of the banknote via the detecting window 11' for making a observation by the observer via the positive lens 17 embedded in the sight-glass 14.

The difference between this embodiment and the first embodiment is that the detecting window 11' and the detecting channel 13' are set upon the sidewall instead of the bottom side, so it makes the construction more cramped, smaller and convenient for carrying.

Referring to FIG. 9 to FIG. 12, the third embodiment is in a mouse-shape, and comprises a lightproof case 1" and a circuit control-detecting device 2. Said lightproof case 1" consists of an upper shield 11" and a base stand 12", which lock together. Said detecting device 2 is mounted on the hollow inside composed of the upper shield 11 and the base stand 12".

Figure 9:
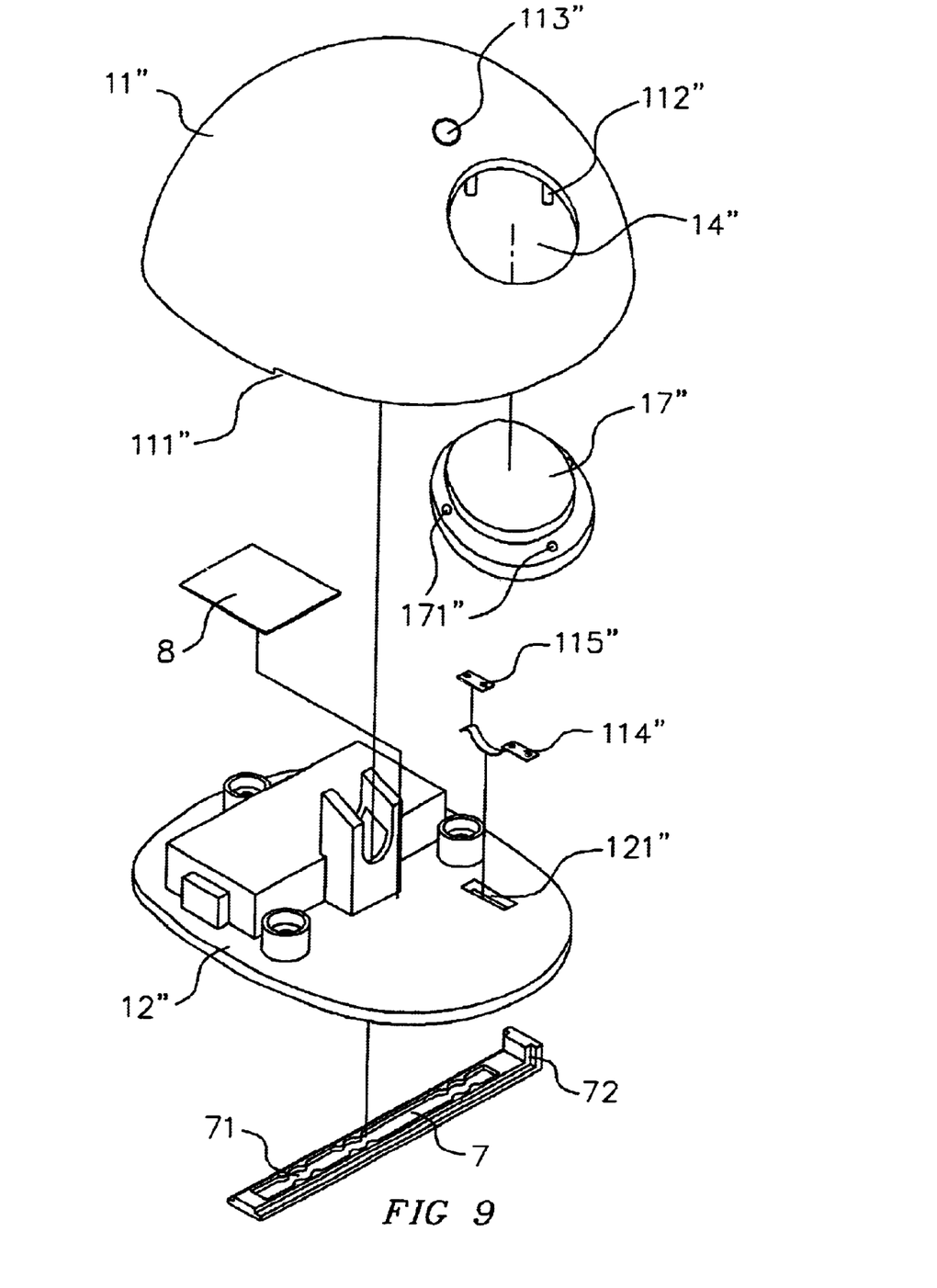
FIG. 9 is an exploded view showing the third embodiment of the present invention.
Figure 10:
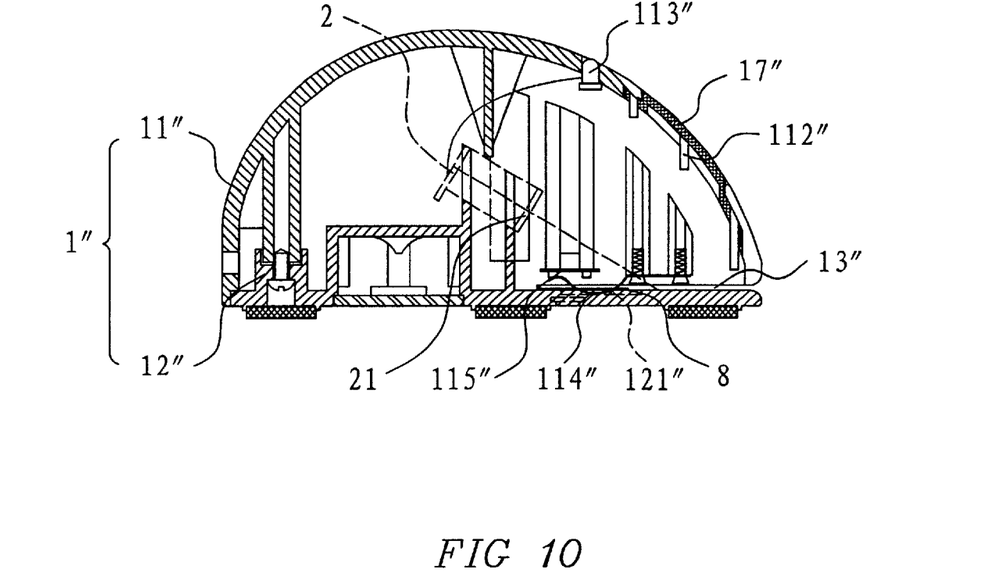
FIG. 10 is a cross-section view of FIG. 9.

Wherein, said upper shield 11" is a half-ball shell having an opening 111" at the bottom edge so that a gap detecting channel 13" is formed between the upper shield 11" and the base stand 12" for inserting a banknote for detection. Said upper shield 11" has a skylight sight-glass 14" opened on a proper position through it so the observer can observe the detecting channel 13". Surrounding said sight-glass 14" on the inside of the upper shield 11", there are several projecting pin lugs 112" for fitting into the holes 171" formed on the flange of a positive lens 17" to locate the positive lens 17" on the sight-glass 14" for enlarging the image. Nearing the detecting channel 13" at the inside of the upper shield 11", a conducting strip 115" and an elastic conducting strip 114" are secured thereon for controlling the circuit to cut on or off. As a banknote is inserted into the detecting channel 13", the elastic conducting strip 114" touches against the conducting strip 115" to cut in the power to the detecting device 2, so said elastic conducting strip 114" and the conducting strip 115" take the place of the switching button 32, as in the first and the second embodiments, to control the power cut on or off without switching of the switching button 32 before operation, thus simplifying the operation and facilitating usage. Said upper shield 11" also has an indicating lamp 113" connecting with the detecting device 2 on the surface to show the working state. When lit, it indicates the control circuit of the detecting device 2 being connected with power in a working state.

Figure 11:
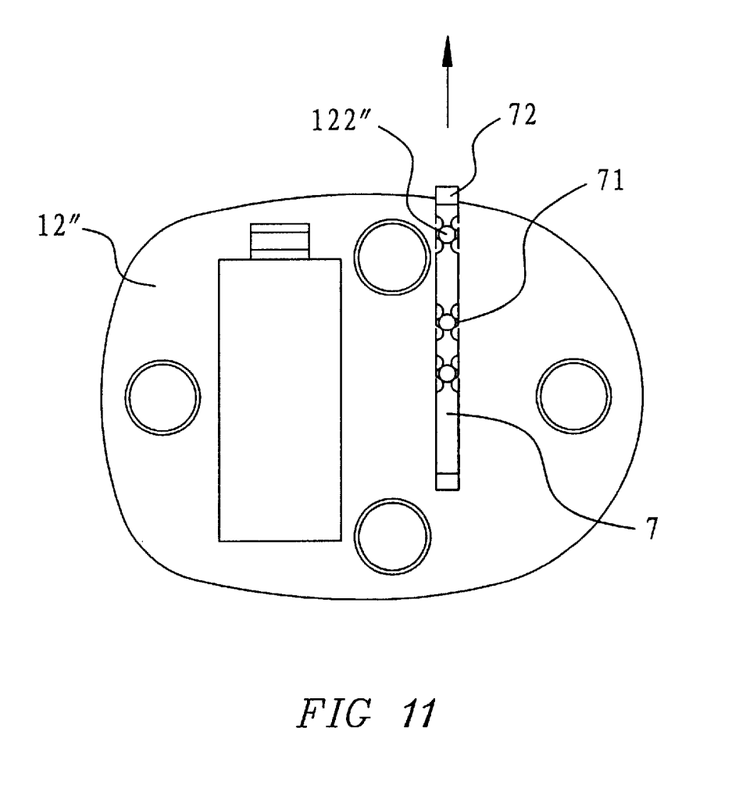
FIG. 11 is a bottom side view of FIG. 10.

Said base stand 12" is attached with an indicating board 8 on the inside of the detecting channel 13" so that the light-emitting component 21 can shine on it for locating the detecting range and accurate position as the operator inserts the banknote into the detecting channel 13". This allows the light emitted from the detecting device 2 to project on the desired detecting range directly, for the convenience of observation. On the bottom side of the base stand 12" there is a groove 121" having several lugs 122" at the inside, as shown in FIG. 11, for embedding an L-shaped rod 7. Corresponding to said lugs 122", the rod 7 has a wave-shape catching groove 71. During detecting, by catching up between the lugs 122" and the wave-shape catching groove 71, according to size of the detecting banknote, pull or push the rod 7 to adjust the locating position to block the edge of the banknote by the limit stop 72 so that the desired detecting range of the banknote exactly lies on the indicating board 8. Setting up the L-shaped rod 7 allows for locating the desired detecting range of the banknote on the indicating board 8 accurately when inserting different size banknotes into the detecting channel 13". During idle time, the rod 7 can be pushed into the groove 121" for saving space.

Figure 12:
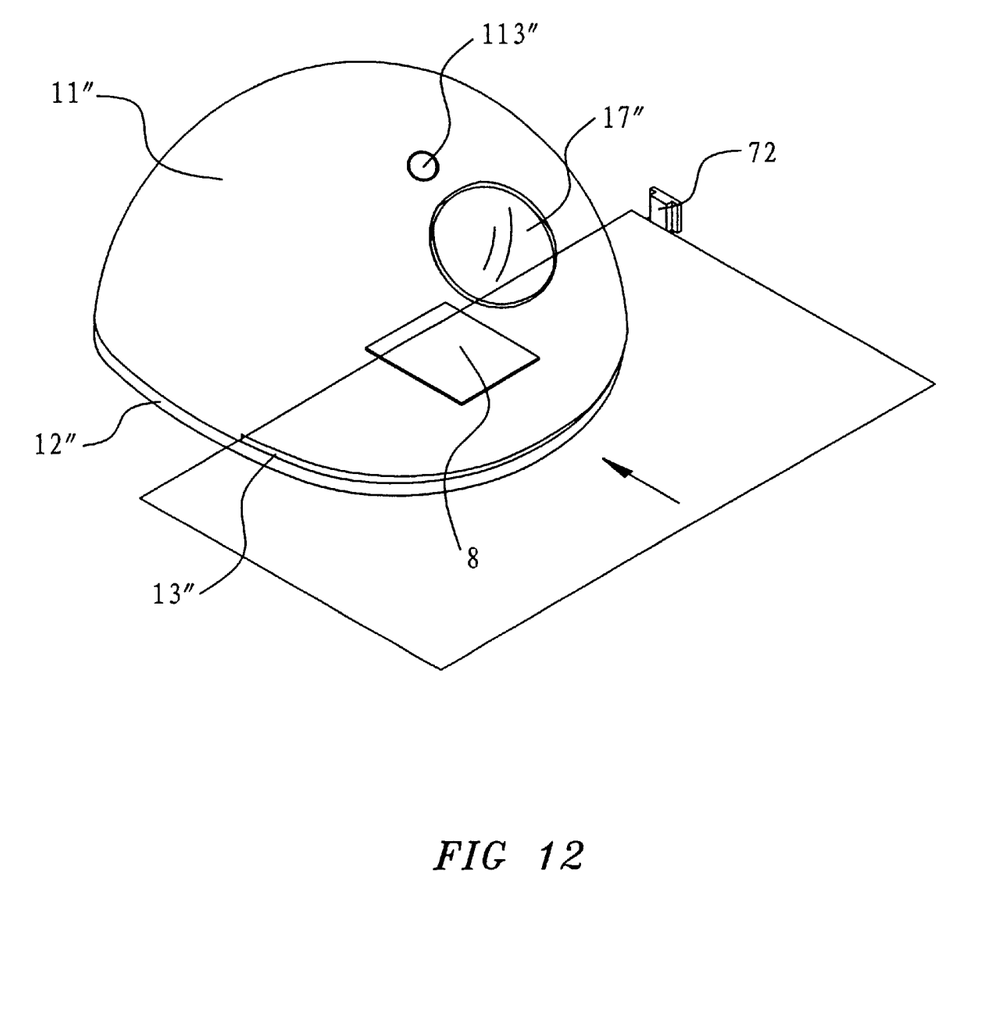
FIG. 12 is a scheme showing the using state of the third embodiment of the present invention.

In operation of this embodiment, the observer can adjust the position of the rod 7 depending on the size of the banknote, then put the edge of the banknote against the limit stop 72, maintaining contact as the banknote is pulled into the detecting channel 13". Halfway in, the banknote jacks up the elastic conducting strip 114" to touch the conducting strip 115", and the indicating lamp 113" is lighted, showing the detecting device 2 is powered. When the banknote is inserted into the detecting channel 13" completely, the ultraviolet ray or the infrared ray emitted from the detecting device 2 exactly shines on the desired detecting range of the banknote so that the observer can observe it via the positive lens on the sight-glass 14".

This embodiment is different from the above-mentioned former two embodiments, it not only is used on the desk top, certainly due to the small volume, but also it can be convenient for transport.

Additional, said detecting device 2 provided in this embodiment may have two light-emitting components, one is an ultraviolet lamp, and another is an infrared lamp. Both of them are connected to the detecting device 2 so that the banknote detector has two detecting methods-ultraviolet and infrared detecting functions to make the verifying operation more convenient.

So the key features of the present invention is to provide a lightproof cartridge with a gap-detecting channel so as to reduce the radiation of static electricity to the human body, and to avoid the user unexpectedly inserting fingers into the detecting window, therefore the operation of is very safe.

We claim:

1. A banknote scope comprising a lightproof cartridge and a circuit control-detecting device, wherein a light-emitting component of said circuit control-detecting device is positioned within the inside of the lightproof cartridge, said lightproof cartridge having a gap-detecting channel so that a light ray emitted from the circuit control-detecting device exactly shines on the gap-detecting channel via a detecting window, the lightproof cartridge having a sight-glass positioned opposite the detecting window for observation by a user, said lightproof cartridge having a through-hole formed therethrough, a switching button of said circuit control-detecting device projecting through said through-hole, a graded slot being formed within said lightproof cartridge adjacent said through-hole for selectively and releasably maintaining said switching button in a closed state.

2. The banknote scope as claimed in claim 1, wherein said lightproof cartridge is shaped substantially like a cap of a pen, said circuit control-detecting device being installed in a sleeve, and said light-emitting component of the circuit control-detecting device being positioned on a tip end of the sleeve, said lightproof cartridge covering said light-emitting component of the detecting device.

3. The banknote scope as claimed in claim 1, wherein said lightproof cartridge comprises an upper shield and a base stand, said circuit control-detecting device being mounted within a hollow inside space formed within said upper shield and said base stand.

4. The banknote scope as claimed in claim 3, wherein an elastic conducting strip and a conducting strip are secured within the gap-detecting channel.

5. The banknote scope as claimed in claim 4, wherein an indicating board is positioned within said gap-detecting channel corresponding to the sight-glass.

6. The banknote scope as claimed in claim 5, wherein an indicating lamp is mounted on said upper shield.

7. The banknote scope as claimed in claim 6, wherein said base stand has a groove at a bottom side thereof for embedding a sliding L-shaped rod.

8. The banknote scope as claimed in claim 1 or 2 or 3 or 4 or 5 or 6 or 7, wherein said sight-glass is embedded with a positive lens.

9. The banknote scope as claimed in claim 1 or 2 or 3 or 4 or 5 or 6 or 7, wherein said sight-glass includes a positive lens and said circuit control-detecting device has first and second light emitting components, said first light emitting component being an ultraviolet lamp, said second light emitting component being an infrared lamp, said first and second light emitting components being connected to the control circuit of said detecting device.

* * * * *